US007024358B2

(12) United States Patent
Shlomot et al.

(10) Patent No.: US 7,024,358 B2
(45) Date of Patent: Apr. 4, 2006

(54) RECOVERING AN ERASED VOICE FRAME WITH TIME WARPING

(75) Inventors: Eyal Shlomot, Long Beach, CA (US); Yang Gao, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 10/799,504

(22) Filed: Mar. 11, 2004

(65) Prior Publication Data

US 2004/0181405 A1 Sep. 16, 2004

Related U.S. Application Data

(60) Provisional application No. 60/455,435, filed on Mar. 15, 2003.

(51) Int. Cl.
*G10L 15/12* (2006.01)
*G10L 11/04* (2006.01)
*G06F 11/00* (2006.01)

(52) U.S. Cl. ....................... 704/241; 704/207; 714/747

(58) Field of Classification Search ................ 704/201, 704/207, 225, 229, 241, 205; 714/3, 6, 747
See application file for complete search history.

(56) References Cited

U.S. PATENT DOCUMENTS

| | | | | |
|---|---|---|---|---|
| 4,751,737 | A * | 6/1988 | Gerson et al. | 704/241 |
| 5,086,475 | A * | 2/1992 | Kutaragi et al. | 704/265 |
| 5,909,663 | A * | 6/1999 | Iijima et al. | 704/226 |
| 6,111,183 | A * | 8/2000 | Lindemann | 84/633 |
| 6,169,970 | B1 * | 1/2001 | Kleijn | 704/219 |
| 6,233,550 | B1 * | 5/2001 | Gersho et al. | 704/208 |
| 6,504,838 | B1 * | 1/2003 | Kwan | 370/352 |
| 6,581,032 | B1 * | 6/2003 | Gao et al. | 704/222 |
| 6,636,829 | B1 * | 10/2003 | Benyassine et al. | 704/201 |
| 6,775,654 | B1 * | 8/2004 | Yokoyama et al. | 704/500 |
| 6,810,273 | B1 * | 10/2004 | Mattila et al. | 455/570 |
| 6,889,183 | B1 * | 5/2005 | Gunduzhan | 704/207 |
| 2002/0133334 | A1 * | 9/2002 | Coorman et al. | 704/211 |
| 2004/0120309 | A1 * | 6/2004 | Kurittu et al. | 370/352 |

* cited by examiner

*Primary Examiner*—Susan McFadden
*Assistant Examiner*—James S. Wozniak
(74) *Attorney, Agent, or Firm*—Farjami & Farjami LLP

(57) ABSTRACT

An approach to reduce the quality impact due to lost voiced frame data is presented. The decoder reconstructs the lost frame using the pitch track from a directly prior frame. When the decoder receives the next frame data, it makes a copy of the reconstructed frame data and continuously time warping it and the received frame data so that the peaks of their pitch cycles coincide. Subsequently, the decoder fades out the time-warped reconstructed frame data while fading in the time-warped received frame data. Meanwhile, the endpoint of the received frame data remains fixed to preclude discontinuity with the subsequent frame.

23 Claims, 5 Drawing Sheets

RECOVERING AN ERASED VOICE FRAME WITH TIME WARPING

RELATED APPLICATIONS

The present application claims the benefit of U.S. provisional application Ser. No. 60/455,435, filed Mar. 15, 2003, which is hereby fully incorporated by reference in the present application.

U.S. patent application Ser. No. 10/799,533, "SIGNAL DECOMPOSITION OF VOICED SPEECH FOR CELP SPEECH CODING."

U.S. patent application Ser. No. 10/799,503, "VOICING INDEX CONTROLS FOR CELP SPEECH CODING."

U.S. patent application Ser. No. 10/799,505, "SIMPLE NOISE SUPPRESSION MODEL."

U.S. patent application Ser. No. 10/799,460, "ADAPTIVE CORRELATION WINDOW FOR OPEN-LOOP PITCH."

BACKGROUND OF THE INVENTION

1. Field of the Invention

The present invention relates generally to speech coding and, more particularly, to recovery of erased voice frames during speech decoding.

2. Related Art

From time immemorial, it has been desirable to communicate between a speaker at one point and a listener at another point. Hence, the invention of various telecommunication systems. The audible range (i.e. frequency) that can be transmitted and faithfully reproduced depends on the medium of transmission and other factors. Generally, a speech signal can be band-limited to about 10 kHz without affecting its perception. However, in telecommunications, the speech signal bandwidth is usually limited much more severely. For instance, the telephone network limits the bandwidth of the speech signal to between 300 Hz to 3400 Hz, which is known in the art as the "narrowband". Such band-limitation results in the characteristic sound of telephone speech. Both the lower limit at 300 Hz and the upper limit at 3400 Hz affect the speech quality.

In most digital speech coders, the speech signal is sampled at 8 kHz, resulting in a maximum signal bandwidth of 4 kHz. In practice, however, the signal is usually band-limited to about 3600 Hz at the high-end. At the low-end, the cut-off frequency is usually between 50 Hz and 200 Hz. The narrowband speech signal, which requires a sampling frequency of 8 kb/s, provides a speech quality referred to as toll quality. Although this toll quality is sufficient for telephone communications, for emerging applications such as teleconferencing, multimedia services and high-definition television, an improved quality is necessary.

The communications quality can be improved for such applications by increasing the bandwidth. For example, by increasing the sampling frequency to 16 kHz, a wider bandwidth, ranging from 50 Hz to about 7000 Hz can be accommodated. This bandwidth range is referred to as the "wideband". Extending the lower frequency range to 50 Hz increases naturalness, presence and comfort. At the other end of the spectrum, extending the higher frequency range to 7000 Hz increases intelligibility and makes it easier to differentiate between fricative sounds.

The frame may be lost because of communication channel problems that results in a bitstream or a bit package of the coded speech being lost or destroyed. When this happens, the decoder must try to recover the speech from available information in order to minimize the impact on the perceptual quality of speech being reproduced.

Pitch lag is one of the most important parameters for voiced speech, because the perceptual quality is very sensitive to pitch lag. To maintain good perceptual quality, it is important to properly recover the pitch track at the decoder. Thus, a traditional practice is that if the current voiced frame bitstream is lost, pitch lag is copied from the previous frame and the periodic signal is constructed in terms of the estimated pitch track. However, if the next frame is properly received, there is a potential for quality impact because of discontinuity introduced by the previously lost frame.

The present invention addresses the impact in perceptual quality due to discontinuities produced by lost frames.

SUMMARY OF THE INVENTION

In accordance with the purpose of the present invention as broadly described herein, there is provided systems and methods for recovering an erased voice frame to minimize degradation in perceptual quality of synthesized speech.

In one embodiment, the decoder reconstructs the lost frame using the pitch track from the directly prior frame. When the decoder receives the next frame data, it makes a copy of the reconstructed frame data and continuously time warping it and the next frame data so that the peaks of their pitch cycles coincide. Subsequently, the decoder fades out the time-warped reconstructed frame data while fading in the time-warped next frame data. Meanwhile, the endpoint of the next frame data remains fixed to preclude discontinuity with the subsequent frame.

These and other aspects of the present invention will become apparent with further reference to the drawings and specification, which follow. It is intended that all such additional systems, methods, features and advantages be included within this description, be within the scope of the present invention, and be protected by the accompanying claims.

DETAILED DESCRIPTION

The present application may be described herein in terms of functional block components and various processing steps. It should be appreciated that such functional blocks may be realized by any number of hardware components and/or software components configured to perform the specified functions. For example, the present application may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present application may employ any number of conventional techniques for data transmission, signaling, signal processing and conditioning, tone generation and detection and the like. Such general techniques that may be known to those skilled in the art are not described in detail herein.

Figure 1:
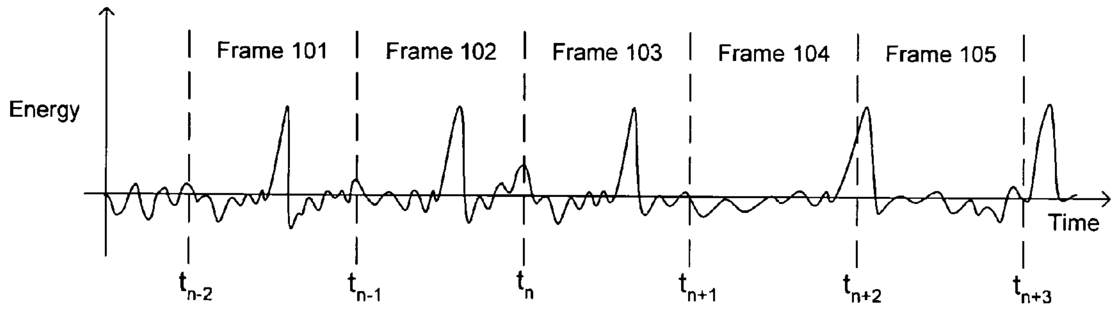
FIG. 1 is an illustration of the time domain representation of a coded voiced speech signal at the encoder.

FIG. 1 is an illustration of the time domain representation of a coded voiced speech signal at the encoder. As illustrated, the voiced speech signal is separated into frames (e.g. frames 101, 102, 103, 104, and 105) before coding. Each frame may contain any number of pitch cycles (i.e. illustrated as big mounds). Each frame is transmitted from the encoder to the receiver as a bitstream after coding. Thus, for example, frame 101 is transmitted to the receiver at $t_{n-1}$, frame 102 at $t_n$, frame 103 at $t_{n+1}$, frame 104 at $t_{n+2}$, frame 105 at $t_{n+3}$, and so on.

Figure 2:
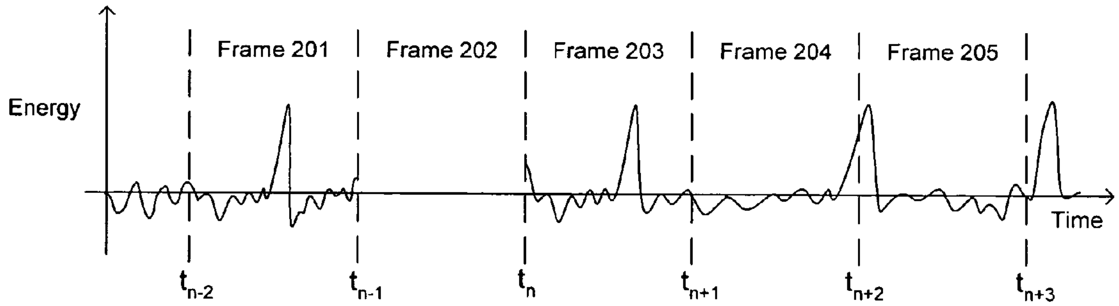
FIG. 2 is an illustration of the time domain representation of the coded voiced speech signal of FIG. 1, as received at the decoder.

FIG. 2 is an illustration of the time domain representation of the coded voiced speech signal of FIG. 1, as received at the decoder. As illustrated, frame 101 arrives properly at the decoder as frame 201; Frame 103 arrives properly at the decoder as frame 203; Frame 104 arrives properly at the decoder as frame 204; and Frame 105 arrives properly at the decoder as frame 205. However, frame 102 does not arrive at the decoder because it was lost in transmission. Thus, frame 202 is blank.

Figure 3:
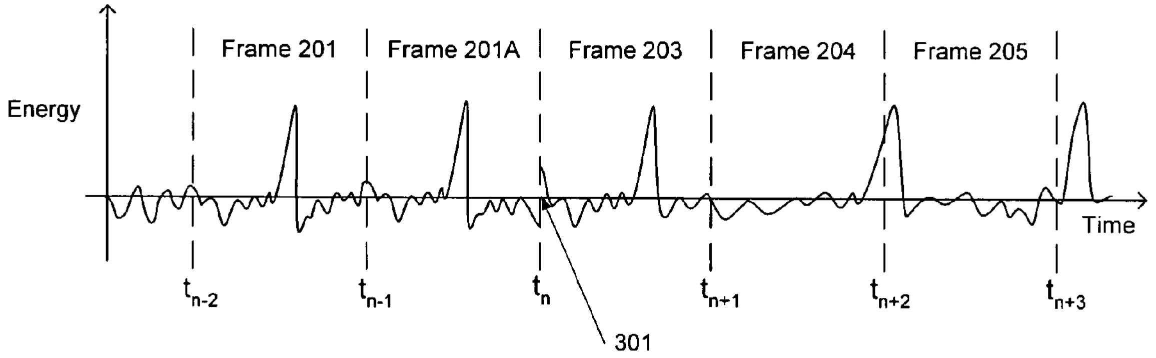
FIG. 3 is an illustration of the discontinuity in the time domain representation of the coded voiced speech signal after recovery of a lost frame.

To maintain perceptual quality, frame 202 must be reproduced at the decoder in real-time. Thus frame 201 is copied into frame 202 slot as frame 201A. However, as shown in FIG. 3, a discontinuity may exist at the intersection of frames 201A and 203 (i.e. point 301) because the previous pitch track (i.e. frame 201A) is likely not accurate . This is because frame 203 was properly received thus its pitch track is correct. But since frame 201A is a reproduced frame 201, its endpoint may not coincide with the beginning point of correct frame 203 thus creating a discontinuity that may affect perceptual quality.

Thus, although frame 201A is likely incorrect, it may no longer be modified since it has already been synthesized (i.e. its time has passed and the frame has been sent out). The discontinuity at 301 created by the lost frame may produce an audible reproduction at the beginning of the next frame that is annoying.

Figure 4:
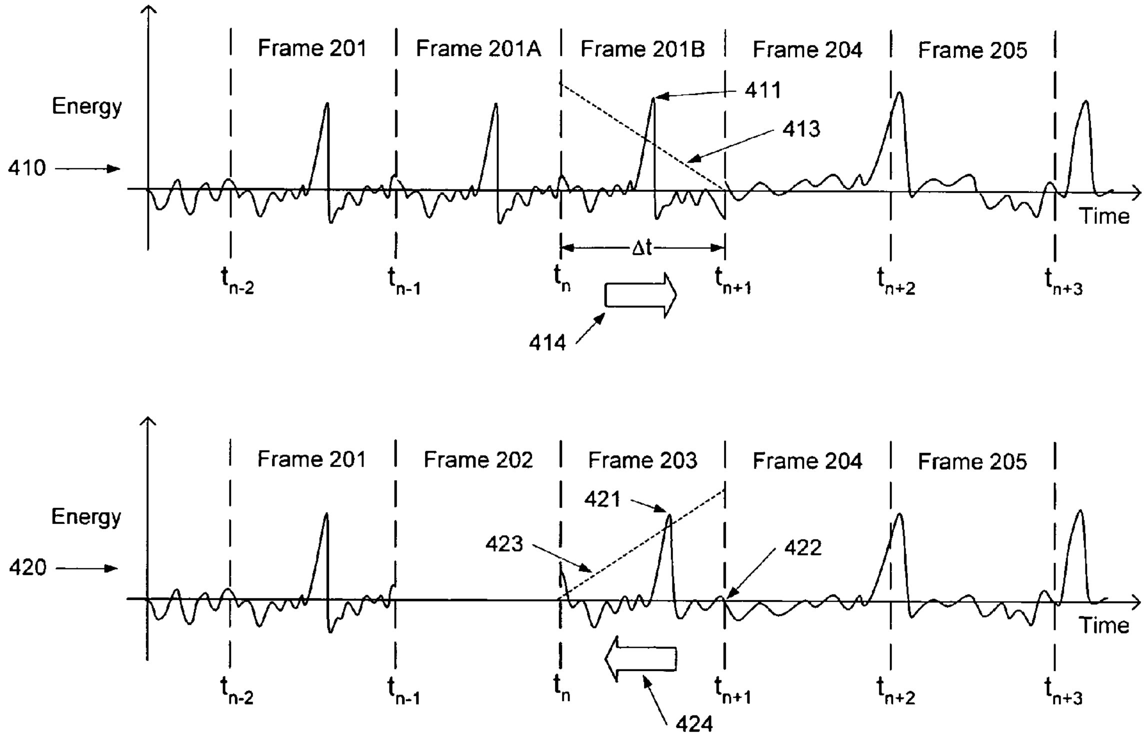
FIG. 4 is an illustration of the time warping process in accordance with an embodiment of the present invention.

Embodiments of the present invention use continuous time warping to minimize impact on perceptual quality. Time warping involves mainly modifying or shifting the signals to minimize the discontinuity at the beginning of the frame and also improve the perceptual quality of the frame. The process is illustrated using FIG. 4 and FIG. 5. As illustrated in FIG. 4, time history 420 is the actual received data (see FIG. 2) showing the lost frame 202. Time history 410 is a pseudo received data constructed from the received data. Time history 410 is constructed in real-time by placing a copy of received frame 201 into frame slot 202 as frame 201A and into frame slot 203 as frame 201B. Note that frame 203, frame 204, and frame 205 arrive properly in real-time and are correctly received in this illustration.

Figure 5:
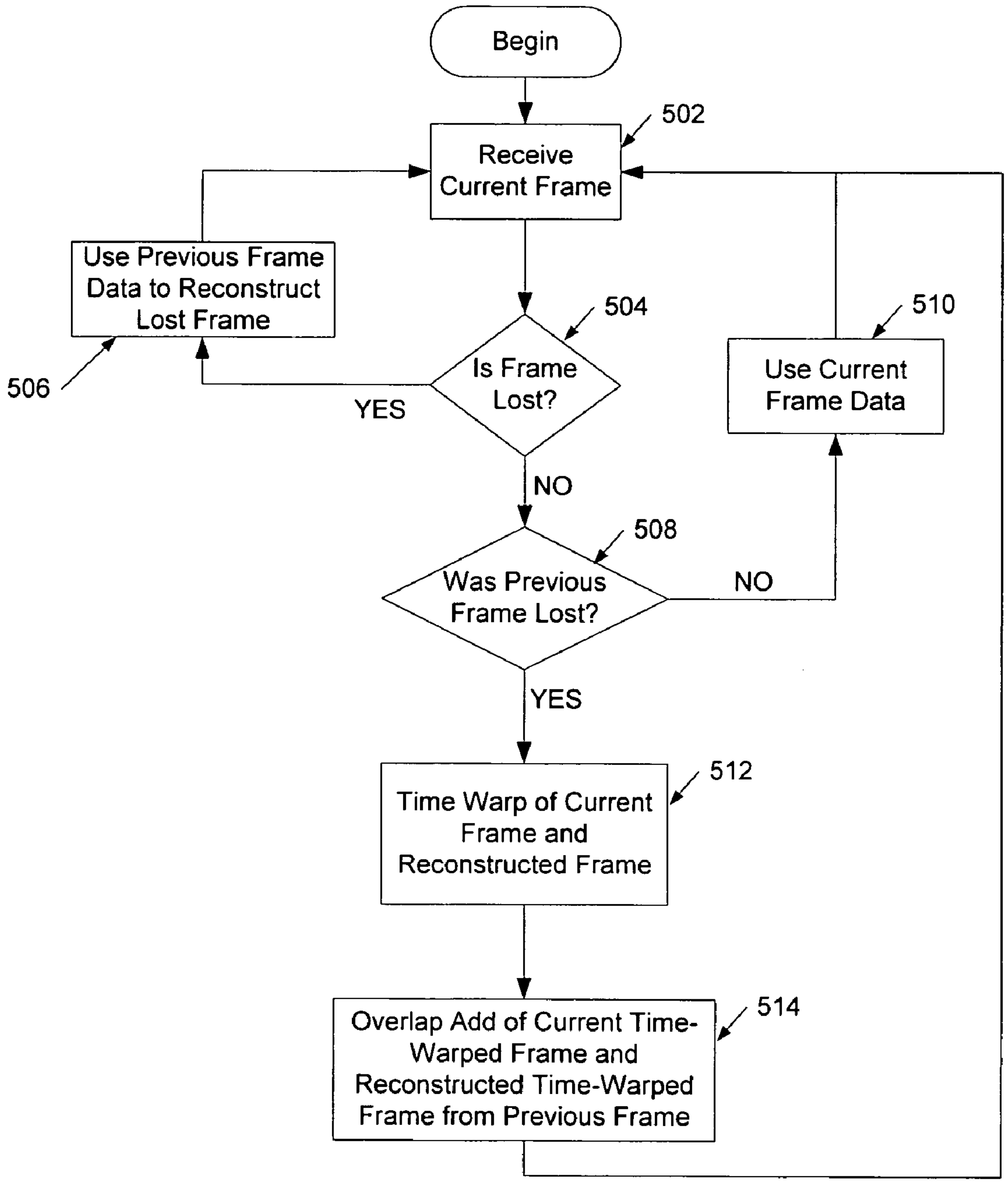
FIG. 5 illustrates real-time voiced frame recovery in accordance with an embodiment of the present invention.

The process involves continuously time warping frames 201B of 410 and frame 203 of 420 so that their peaks, 411 and 421, coincide in time while maintaining the intersection point (e.g. endpoint 422) between frames 203 and 204 fixed. For instance, peak 411 may be stretched forward (as illustrated by arrow 414) in time by some delta while peak 421 is stretched backward (as illustrated by arrow 424) in time. The intersection point 422 must be maintained because the next frame (e.g. 204) may be a correct frame and it is desired to keep continuity between the current frame and the correct next frame, as in this illustration. After time-warping, an overlap-add of the two signals of the warped frames may be used to create the new frame. Line 413 fades out the reconstructed previous frame while line 423 fades in the current frame. The sum of curves 413 and 423 has a magnitude of one at all points in time. FIG. 5 illustrates real-time voiced frame recovery in accordance with an embodiment of the present invention.

As illustrated in FIG. 5, a current frame of voiced data is received in block 502. A determination is made in block 504 whether the frame is properly received. If not, the previous frame data is used to reconstruct the current frame data in block 506 and processing returns back to block 502 to receive the next frame data. If, on the other hand, the current frame data is properly received (as determined in block 504), further determination is made in block 508 whether the previous frame was lost, i.e., reconstructed. If the previous frame was not lost, the decoder proceeds to use the current frame data in block 510 and then returns back to block 502 to receive the next frame data.

If, on the other hand, the previous frame data was lost received (as determined in block 508) and the current frame data is properly received, then time warping is necessary. In block 512, the pitch of the current frame and that of the reconstructed frame is time-warped so that they will coincide. During time-warping, the end-point of the current frame is maintained because the next frame may be a correct frame.

After the frames are time warped in block 512, the time-warped current frame is faded in while the time-warped reconstructed frame is faded out in block 514. The combined fade-in and fade-out process (over-lap-add process) may take on the form of the following equation:

$$\text{NewFrame}(n)=\text{ReconstFrame}(n).[1-a(n)]+\text{Current-Frame}(n).a(n),\ n=0,\ 1,\ 2\ \ldots,\ L-1;$$

where 0<=a(n)<=1, usually a(0)=0 and a(L−1)=1.

After the fade process is completed in block 514, processing returns to block 502 where the decoder awaits receipt of the next frame data. Processing continues for each received frame and the perceptual quality is maintained.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method for recovering a speech frame, the method comprising:

reconstructing a first current input speech frame from a previous input speech frame to generate a constructed first current input speech frame in response to an indication that said first current input speech frame has not been properly received;

obtaining a second current input speech frame immediately following said first current input speech frame;

time warping said second current input speech frame and said reconstructed first current input speech frame to coincide a peak of said second current input speech frame with a peak of said reconstructed first current input speech frame while maintaining an intersection point of said second current input speech frame with a third current input speech frame immediately following said second current input speech frame, wherein said time warping generates a time-warped second current input speech frame and a time-warped reconstructed first input speech frame; and creating a new second current input speech frame by overlapping-and-adding said time-warped second current input speech frame and said time-warped reconstructed first current input speech frame.

2. The method of claim 1, wherein each of said speech frame represents a speech signal having zero or more pitch cycles.

3. The method of claim 2, wherein said time warping comprises shifting one or more peaks of said pitch cycles of said second current input speech frame and one or more peaks of said pitch cycles of said reconstructed first current input speech frame to coincide at least one of said one or more peaks.

4. The method of claim 1, wherein said overlapping-and-adding fades-in said second current input speech frame and fades-out said reconstructed first current input speech frame.

5. The method of claim 1, wherein said reconstructing said first current input speech frame from a previous input speech frame comprises copying said previous input speech frame as said reconstructed first current input speech frame.

6. The method of claim 1, wherein said previous input speech frame immediately precedes said first current input speech frame.

7. The method of claim 1, wherein said overlapping-and-adding is a linear fade operation.

8. The method of claim 1, wherein said time warping warps said second current input speech frame and said reconstructed first current in opposing directions to coincide said peaks.

9. The method of claim 8, wherein said time warping stretches said second current input speech frame in one direction and said reconstructed first current in another direction to coincide said peaks.

10. An apparatus for recovering a speech frame, the apparatus comprising:

a receiver for obtaining a first current input speech frame and a second current input speech frame immediately following said first current input speech frame; and a reconstruction element for reconstructing said first current input speech frame from a previous input speech frame to generate a reconstructed first current input speech frame in response to an indication that said first current input speech frame has not been properly received;

a time warping element for time warping said second current input speech frame and said reconstructed first current input speech frame to coincide a peak of said second current input speech frame with a peak of said reconstructed first current input speech frame while maintaining an intersection point of said second current input speech frame with a third current input speech frame immediately following said second current input speech frame, wherein said time warping element generates a time-warped second current input speech frame and a time-warped reconstructed first current input speech frame; and an overlap-and-add element for creating a new second current input speech frame by overlapping-and-adding said time-warped second current input speech frame and said time-warped reconstructed first current input speech frame.

11. The apparatus of claim 10, wherein each of said speech frame represents a speech signal having zero or more pitch cycles.

12. The apparatus of claim 11, wherein said time warping comprises shifting one or more peaks of said pitch cycles of said second current input speech frame and one or more peaks of said pitch cycles of said reconstructed first current input speech frame to coincide at least one of said one or more peaks.

13. The apparatus of claim 10, wherein said overlapping-and-adding fades-in said second current input speech frame and fades-out said reconstructed first current input speech frame.

14. The apparatus of claim 10, wherein said reconstructing said first current input speech frame from a previous input speech frame comprises copying said previous input speech frame as said reconstructed first current input speech frame.

15. The apparatus of claim 10, wherein said previous input speech frame immediately precedes said first current input speech frame.

16. The apparatus of claim 10, wherein said overlapping-and-adding is a linear fade operation.

17. A computer program product comprising:

a computer usable medium having computer readable program code embodied therein, said computer readable program code configured to cause a computer to recover said speech frame by:

reconstructing a first current input speech frame from a previous input speech frame to generate a reconstructed first current input speech frame in response to an indication that said first current input speech frame has not been properly received;

obtaining a second current input speech frame immediately following said first current input speech frame;

time warping said second current input speech frame and said reconstructed first current input speech frame to coincide a peak of said second current input speech frame with a peak of said reconstructed first current input speech frame while maintaining an intersection point of said second current input speech frame with a third current input speech frame immediately following said second current input speech frame, wherein said time warping generates a time-warped second current input speech frame and a time-warped reconstructed first current input speech frame; and creating a new second current input speech frame by overlapping-and-adding said time-warped second current input speech frame and said time-warped reconstructed first current input speech frame.

18. The computer program product of claim 17, wherein each of said speech frame represents a speech signal having zero or more pitch cycles.

19. The computer program product of claim 18, wherein said time warping comprises shifting one or more peaks of said pitch cycles of said second current input speech frame and one or more peaks of said pitch cycles of said reconstructed first current input speech frame to coincide at least one of said one or more peaks.

20. The computer program product of claim 17, wherein said overlapping-and-adding fades-in said second current input speech frame and fades-out said reconstructed first current input speech frame.

21. The computer program product of claim 17, wherein said reconstructing said first current input speech frame from a previous input speech frame comprises copying said previous input speech frame as said reconstructed first current input speech frame.

22. The computer program product of claim 17, wherein said previous input speech frame immediately precedes said first current input speech frame.

23. The computer program product of claim 17, wherein said overlapping-and-adding is a linear fade operation.

* * * * *

UNITED STATES PATENT AND TRADEMARK OFFICE

CERTIFICATE OF CORRECTION

PATENT NO. : 7,024,358 B2
APPLICATION NO. : 10/799504
DATED : April 4, 2006
INVENTOR(S) : Shlomot et al.

It is certified that error appears in the above-identified patent and that said Letters Patent is hereby corrected as shown below:

In the claims, column 4, line 55, “constructed” should be changed to --reconstructed--.

Signed and Sealed this

Seventh Day of November, 2006

JON W. DUDAS
*Director of the United States Patent and Trademark Office*